Sept. 28, 1943.　　　　E. H. PIRON　　　　2,330,739
HYDRAULIC BRAKING SYSTEM
Filed Nov. 29, 1940　　　　2 Sheets-Sheet 1

INVENTOR.
Emil H. Piron
BY

Sept. 28, 1943.　　　　E. H. PIRON　　　　2,330,739
HYDRAULIC BRAKING SYSTEM
Filed Nov. 29, 1940　　　2 Sheets-Sheet 2

INVENTOR.
Emil H. Piron
BY

Patented Sept. 28, 1943

2,330,739

UNITED STATES PATENT OFFICE 2,330,739

HYDRAULIC BRAKING SYSTEM

Emil H. Piron, New York, N. Y., assignor to Transit Research Corporation, New York, N. Y., a corporation of New York Application November 29, 1940, Serial No. 367,827

10 Claims. (Cl. 188—170)

This invention relates to brakes for heavy vehicles in general and particularly to street railway vehicles and has for its primary object to provide light weight power units, in quantities of more than one per vehicle, adapted to operate friction brakes in any desired order, in fractional groups of one or more friction brakes, with each group composed of a number less than the total number of friction brakes on the vehicle.

The practice in the street car industry is to use frictional braking systems in which the brake application is made by the action of compressed air and the release by springs, although in some cases the order is reversed and the application is made by the action of pre-loaded springs and the release by compressed air or electro-magnetic means. In the first case a hand brake is provided to permit emergency application of the brakes in case the compressed air system fails, and for parking when the compressed air system is inactive. In the second case the hand brake is unnecessary but some type of hand operated mechanical means must be provided to permit emergency release in the event the compressed air or the electro-magnetic system fails.

It is also the practice in the street car industry to apply friction brakes against the treads of the wheels, although in some the friction brakes are applied against special brake drums mounted on the axles or on the motor shafts. The invention here described is applicable to either system mentioned above, with direct or spring applications, whether used on the wheels or on brake drums on the axles or motor shafts.

In providing for operation of the friction brakes in fractional groups the entire friction braking system is not rendered inoperative by the failure of one fractional group or of one power unit, as is the case in systems built according to present practice. Therefore, there is a good probability that a sufficient number of friction brakes will remain operative in order that the vehicle may be safely moved to a repair shop.

Another object is to provide a power unit adapted to operate friction brakes in response to a remote control and, more specifically, adapted to independently actuate the brakes associated with axles, or with motor shafts, or of one truck of a rail vehicle, or of the tractor part or of the trailer part or parts of coupled road vehicles, said power unit being adapted to be mounted on the corresponding axle assembly, motor assembly, truck, tractor part or trailer part and being designed to occupy a sufficiently small space to fit on the assembly or part considered and, further, being capable of being built at sufficiently low weight and cost to justify its multiplicity.

Another object is to provide a power unit of the type above referred to embodying an electric motor, preferably operated by a battery, an oil pump operated by the motor, an accumulator connected with the pump for storing the oil under pressure, an automatic control which causes the motor to operate when the accumulator supply drops below a predetermined amount and to automatically stop the motor when a satisfactory supply is present, and a reducing valve adapted to be electrically operated by a motorman from a remote point for admitting liquid at a pressure determined by the will of the operator from the accumulator to the corresponding brake operating cylinder and piston.

The system is so divided into a number of independent units, that, if one unit fails, the others remain in operative condition. It permits distribution of the braking action according to various prearranged schemes, for instance so that operation of the operator's control automatically starts brake action on a trailer first and on the truck later, in any desired proportions. The unit is light, extremely compact and comparatively inexpensive, and reserve units can, therefore, be kept available for replacement of defective units without requiring an unreasonable investment. The unit can be installed in the immediate vicinity of any braking unit or group of braking units, thus eliminating the long, fragile and costly pipings and flexible couplings which are a source of frequent trouble in hydraulic brake systems.

Another object of the invention is to provide an alternative form of power unit operating upon a principle similar to the one above mentioned but so constructed as to eliminate the need for an oil accumulator. In this respect a unit is provided which comprises a torque motor for operating a positive displacement oil pump to supply oil under pressure to the brake release cylinder. In series with the motor, and a control for varying the current to the motor, is a solenoid which actuates a valve for discharging oil from the system to lower the pressure therein. The motor and solenoid are so correlated that under any flow of current the valve is held closed against oil pressure developed by the torque of the motor when stalled. If, through actuation of the control, the current is decreased and causes a corresponding decrease in the pull of the solenoid, the valve is allowed to open under pressure of the oil and some of the oil is exhausted, thus reducing the oil pressure to that which is obtained from the stalled motor under the new current supply. In this manner the oil pressure is regulated to balance a fraction of the spring pressure and to result in a partial brake application. To obtain full braking, the resistance is so increased that the current supply is practically nil, in which case the pull of the solenoid is zero, and the valve is free to unseat under any oil pressure in the system.

The last referred to power unit has an advantage from a safety standpoint in that if any part of the circuit or apparatus fails, oil pressure falls, or fails to build up, the brake will remain applied with maximum force.

Other objects and advantages will become more fully apparent as reference is had to the accompanying drawings wherein my invention is illustrated, and in which Fig. 1 is a diagram of the power unit, Fig. 2 is a diagram illustrating a brake system embodying a power unit for operating brakes on the two motor shafts of one rail car truck, Fig. 3 is a diagram illustrating a power unit for operating a set of brakes associated with wheels on a common axle.

Figure 1:
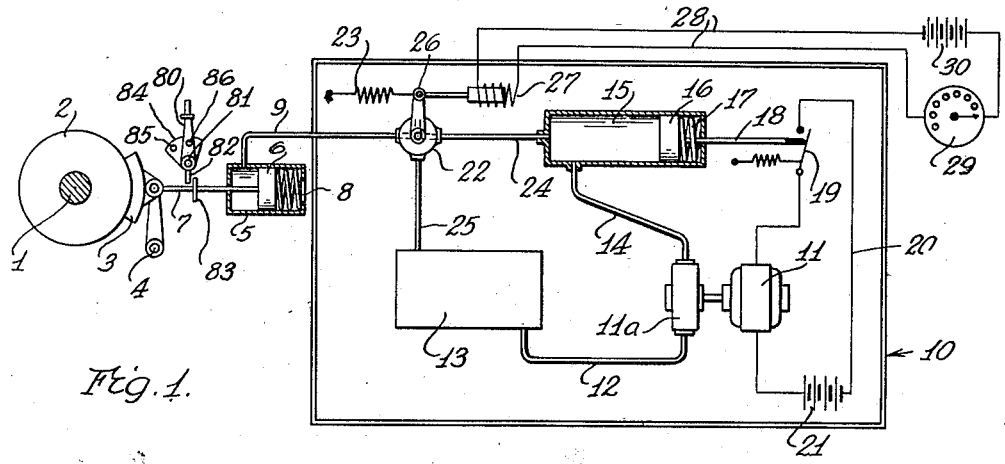

More specifically, 1 designates a shaft having a drum 2 thereon adjacent which a brake shoe 3 is pivotally mounted at 4 for contact with the drum. Adjacent the shoe 3 is a cylinder 5 having a piston 6 slidably mounted therein and connected to the shoe by a rod 7. A spring 8 presses against the piston and normally presses the shoe against the drum. To retract the shoe from the drum fluid, preferably hydraulic, is supplied under pressure to the cylinder 5 through a pipe line 9, and acts to move the piston against the opposition of the spring 8.

The unit above described is intended to represent any special or conventional brake unit designed for operation by fluid pressure, and the shaft 1 may be imagined as being a truck axle or a shaft which rotates at greater speed.

The power unit as a whole is designated 10, and comprises a motor 11, a hydraulic pump 11a with an intake pipe 12 from an oil reservoir 13, and an outlet pipe line 14 to a hydraulic accumulator 15 for storing liquid under pressure. In the accumulator 15 is a slidable piston 16 against which a compressing means such as the spring 17 acts to maintain pressure on the liquid which is pumped into the cylinder on the other side of the piston.

Attached to the piston 15 is a rod 18 of such length that when the accumulator is filled with liquid to a predetermined extent it opens a control switch 19 in a motor circuit 20 having a battery 21 as its source of power. Said battery, however, can be located outside the unit 10. When the liquid supply is depleted to a predetermined extent the piston 17 is moved by the spring 8 to retract the rod 18 and allow the switch 19 to close and start the motor and the pump for the purpose of refilling the accumulator.

Figure 7:
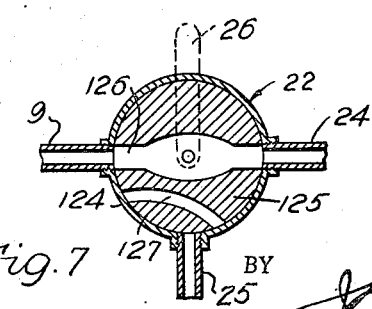
Figure 7 is an enlarged detail of the pressure control valve.

The accumulator 15 is connected to the brake cylinder by the pipe line 24, 9, which has a control valve 22 of the pressure regulating type inserted therein. The valve may be of any suitable type several of which are on the market. In the illustration, Figure 7, the valve 22 consists of a valve housing 124 which contains the valve proper 125. Transversely through the valve 125 is a valve shaft which carries the lever 26 so that movement of the lever 26 causes a corresponding rotation of the valve 125 with respect to its casing 124. The valve 125 has two passages one of which designated as 126 is capable of connecting the pipe line 24 with the pipe line 9, this being the position illustrated. The other passage, designated as 127, is adapted to connect the line 25 with the line 9 as the lever 26 is moved from the position illustrated in a clockwise direction. Leading from the casing of the valve 22 is a pipe line 25 to the oil sump 13. The valve 22 is responsive to the pressure applied by a spring 23 on a connecting member 26 and selectively balanced by the action of a solenoid 27 to which the current supply is regulated by the action of the driver by means of the control 29. The action of spring 23 alone, when the solenoid circuit is open, or when the current it receives is negligible, operates the valve 22 and causes oil to flow through the valve 22 from the accumulator 15 to the cylinder 5 until the oil reaches a pressure in said cylinder corresponding to the desired maximum. When current or more current is admitted through the solenoid 27, its action partially balances that of spring 23, the pressure on the connecting member 26 and valve 22 is reduced and, the action of said valve permits part of the oil in cylinder 5 to flow to the sump 13 until the pressure in said cylinder corresponds to the spring—solenoid balance of pressure on the valve. Thus, the intensity of current in the solenoid 27 regulates the rate of brake application.

If, for any reason, the power unit should be rendered inoperative, the spring 8 will press the shoe against the drum 2. To release the brake under such circumstances a hand lever 80 is pivotally mounted at 81 in a suitable position. This lever has an extension 82 adapted to contact a collar 83 on the rod 7 so that manual pressure on the lever will compress the spring 8 and retract the shoe 3. To hold the shoe retracted in order that the vehicle may be moved to a repair shop a stationary bracket 84 and the lever 80 are provided with apertures 85 and 86. A pin (not shown) may be inserted through these two apertures to hold the lever against movement or the lever may be equipped with a cam which keeps it in the desired position.

The motor shaft of a street car truck is connected to the axle by speed reducing gearing, or differently stated, by torque increasing gearing. Therefore, the braking torque when applied to a drum operating at motor speed need not be as great as when applied to a drum operating at wheel speed, or when applied to the wheels themselves. This makes possible the use of lighter springs and brakes when the drum rotates at motor speeds and the use of lighter springs makes easier the release of the brakes by the simple expedient of a manually operated lever.

Figure 2:
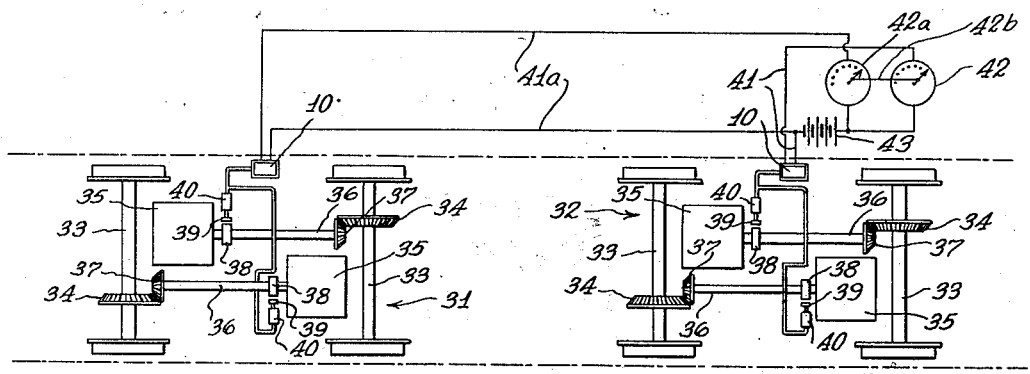

Fig. 2 illustrates a complete braking system with the power unit operating the brakes of the two motor shafts of one truck. As shown in this view, the vehicle embodies two trucks each having two axles 33 with driving gears 34 thereon. Driving motors 35 are suitably mounted on the trucks and have drive shafts 36 connected by gears 37 to respective gears 34. Each drive shaft 36 has a brake drum 38 thereon. Associated with each brake drum is a brake shoe 39 or a connected pair of brake shoes corresponding to the above described shoe 3, and a cylinder 40 containing a brake actuating mechanism similar to that contained in the cylinder 5.

The two cylinders 40 of each truck have a power unit 10 associated therewith. The units 10 are controlled independently by the circuits 41 and 41a each having an individual manual or foot control 42 and 42a respectively for controlling the flow of current from a power source 43 separately in each circuit. The two controls 42 and 42a are connected together at 42b for operation in unison. Obviously, the connection between the members 26 and solenoids 27 in the two units 10 may be so adjusted that all brakes act in exact unison, or they may be adjusted so that one acts slightly in advance of the other or produces a different pressure, or both. Should any one power unit fail, the remaining unit would still be capable of operating.

Figures 3, 4:
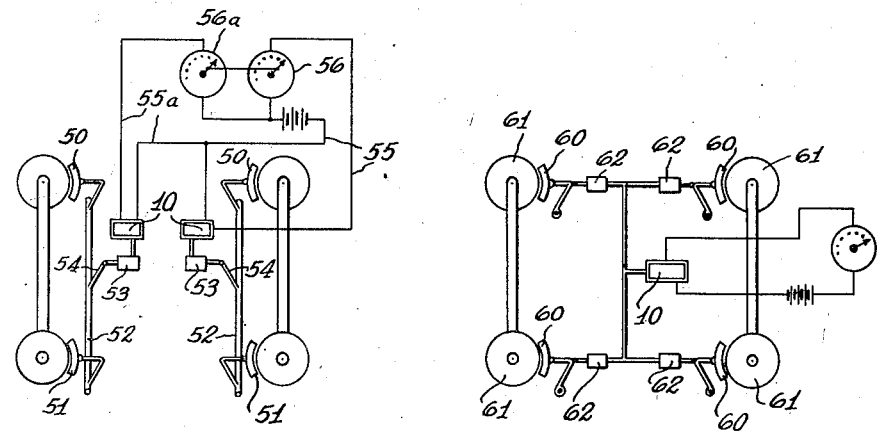
Fig. 4 is a diagram illustrating a power unit for operating a set of brakes associated with the four wheels of a truck.

Fig. 3 illustrates, diagrammatically, brake shoes 50 and 51 mounted on a common actuating shaft 52 for operation in unison. A cylinder 53 has means therein such as shown in the cylinder 5 for actuating a lever 54 for rotating the shaft 52 and operating the brakes. Connected to each of the two cylinders 53 thus provided for actuating the two sets of brakes for each truck is a power unit 10. One of the two power units of this system is in a circuit 55 and the other in a circuit 55a independently controlled by manual or foot controls 56 and 56a corresponding to the control 29.

Fig. 4 discloses a truck having a brake shoe 60 associated with each of the four wheels 61, with each brake shoe connected to an operating mechanism contained in a cylinder 62. The liquid under pressure necessary to operate all four brakes is supplied by a single power unit 10, which is connected to all four cylinders 62.

Figure 5:
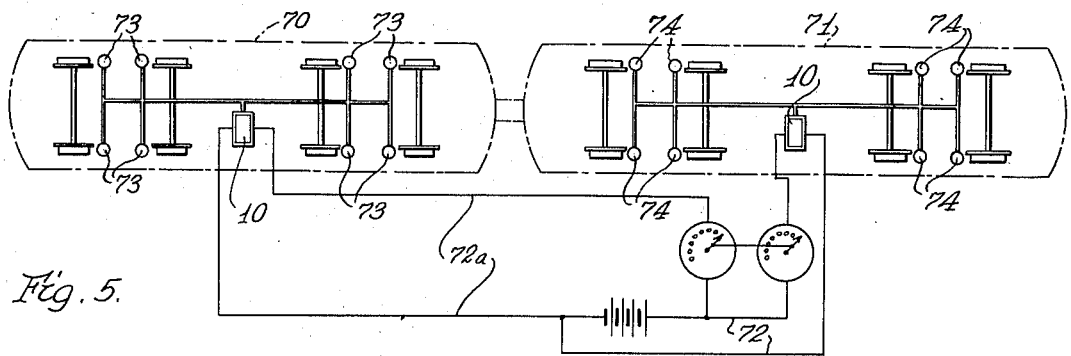
Fig. 5 is a diagram showing the system in conjunction with two coupled vehicles.

Fig. 5, diagrammatically, shows two vehicles 70 and 71 coupled together. Each vehicle has a power unit 10 each with a control circuit 72 and 72a. The power unit 10 on the vehicle 70 is connected to all of the brakes 73 on the vehicle 70, and the power unit 10 on the vehicle 71 is connected to all of the brakes 74 on the vehicle 71. By adjustment of the independent control of these two units the brakes on one vehicle may be caused to operate in advance of those on the other vehicle. The purpose of Fig. 5 is to show this latter function generally and it is to be understood that units may be provided on the powered vehicle according to any of the above described systems, and units may be provided on the trailing unit according to any system.

In a power unit such as is here contemplated it does not matter greatly how frequently the motor and pump start and stop, as the frequency with which they start and stop affects only the motor control switch 19. This switch must, in any case, be very reliable, and inasmuch as reliable switches capable of use in this unit are available on the market the accumulator, which is necessarily one of the largest parts of the power unit may be made comparatively small. In order that the smallness of the accumulator and the compactness of the unit may be more clearly understood a comparison with a known standard street car brake system follows:

A known compressed air brake system now in common use includes an air compressor with a capacity of 10 c. f. m. of free air or, at 65 lbs., $10 \times 14\%_{65} = 2.15$ cu. ft. or 3200 cu. in. per minute of compressed air. A brake application takes on an average 60 cu. in. per brake cylinder or 240 cu. in. for the entire vehicle, where two cylinders are provided on each truck. It is seen, therefore, that the compressor has a capacity which permits making brake applications at the rate $3200/240 = 13$ per minute in theory and possibly 7 per minute in practice, as some of the air is used for other service and to compensate for leakage. Two air reservoirs are usually provided with a capacity of 7500 cu. in. With air at 95 lbs. pressure they contain $7500 \times 95/14 = 51,000$ cu. in. of free air or computed at 65 lbs. pressure 35,000 cu. in. of free air. Hence they contain $(51,000 - 35,000) \times 14\%_{65} = 3450$ cu. in. of air at 65 lbs. pressure in reserve sufficient to supply for $3450/240 = 14$ brake applications in theory and probably 8 applications in practice without help of the compressor.

Inasmuch as it is unimportant how frequently the motor and pump start and stop, and inasmuch as the reserve, even in the case of the large reservoirs of a compressed air system, cannot permit running the vehicle for any great length of time when the compressing or pumping unit fails, the present power unit contemplates the use of comparatively small accumulators. The energy required for braking on the motor shafts is 127.5 in. lbs. per shoe, or 510 in. lbs. per truck per application. The oil required per truck per application is 4.5 cu. in. per truck when oil at 113 lb. gauge pressure is used. A reserve sufficient for 6 brake applications requires an accumulator with a capacity of $6 \times 4.5 = 27$ cu. in., which may have a plunger with a 5 in. stroke, a cross sectional area of 5.4 sq. in. and a diameter of 2⅝ in. The minimum pressure on the plunger must be $5.4 \times 113 = 610$ lbs. It is seen, therefore, that with one accumulator for four brakes, the size of the accumulator is surprisingly small.

According to the characteristics of the spring acting on the accumulator, the oil pressure in it may vary between $610/5.4 = 110$ lbs. to a maximum of $915/5.4 = 169$ lbs. per sq. in. gauge pressure. If the pumping unit is to provide for a flow corresponding to 7 applications per minute or $7 \times 4.5 = 31.5$ cu. in. per minute at maximum pressure of 169 lbs., a gear pump with a rotor 1.5 in. diameter 0.1 in. thick can be used, which has an output of 31.5 cu. in. at a speed of $41.5/.03 = 1050$ R. P. M. The efficiency of such a gear pump is about 60% and the power required to operate it is $31.5 \times 113/.6 = 6000$ in. lbs., or 500 ft. lbs. per minute which corresponds to $500/33,000 = 1/66$ H. P. Therefore, the motor can have a nominal power of $1/50$ H. P., and is of comparatively small size also.

Figure 6:
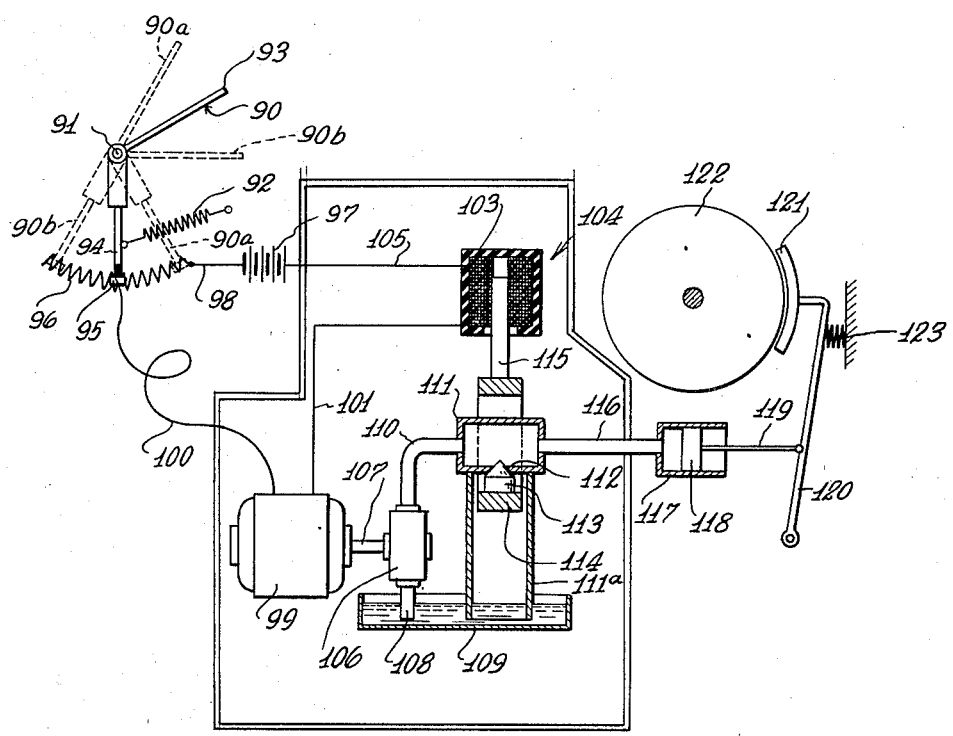
Fig. 6 is a diagram of a modified power unit.

Fig. 6 illustrates a modified power unit 10a adapted to be used in any and all of the assemblies described above in place of the unit 10. The main distinction between the unit 10a and the unit 10 is elimination of the accumulator 15 which forms a necessary part of the unit 10. This change makes possible the use of a simple pressure release valve instead of the double valve called the pressure regulating valve. In the unit 10a, it will be noted, instead of using a pressure accumulator, the output of the pump is increased and the braking action is regulated directly by the torque of the motor on the pump. It is this feature which makes possible the use of a simple release valve to reduce the pressure when necessary.

Referring to Fig. 6, 90 designates a bell crank lever pivoted upon a pin 91. The lever 90 is pivoted in one direction by a spring 92 and is adapted to be pivoted in the opposite direction by pressure exerted by either the hand or foot of the operator on one end 93 of the lever, or by any other equivalent pivoting or sliding arrangement. The other end 94 of the lever 90 carries a contact 95 along an electric resistance 96. The bell crank lever can take any position between the extreme positions 90a and 90b.

The circuit to the resistance element 96 comprises a source of electric current having a fairly constant potential, such for example as the battery 97, which is connected at 98 to the resistance 96. A torque motor 99 has one of its terminals connected by a wire 100 to the contact 95, and its other terminal connected by a wire 101 to the winding 103 of a solenoid 104. The winding 103 is connected by a wire 105 to the battery 97.

The oil pressure circuit comprises an oil pump 106 operated by the motor 99 by a shaft 107, and having an intake pipe 108 extending beneath the normal oil level in an oil sump 109. The outlet of the oil pump is connected by a conduit 110 to a valve housing 111 having an outlet port 112. A valve 113 is mounted upon a yoke 114 which is suspended by the armature 115 of the solenoid 104, and within a drain pipe 111a extending into the sump. When the solenoid 104 is energized the armature 115 moves the yoke in a direction to seat the valve 113 against the port 112, to close the port 112. The valve housing 111 is connected by a conduit 116 to a cylinder 117.

The brake mechanism comprises a piston 118, slidable in the cylinder 117, and connected by a rod 119 to a pivoted lever 120. A brake shoe 121 is mounted upon the lever 120 and is forced into engagement with the wheel 122 by a spring 123. It will be apparent, as far as the action of the brake shoe is concerned that the action is the same whether the spring acts upon the lever as here described, or whether it acts upon the piston as shown in the unit 10.

When the system is properly regulated, the pull of the solenoid under current passing in the electric circuit is just sufficient to keep the valve 113 seated against the oil pressure developed in the valve housing 111 by the torque of the motor 99 when stalled, regardless of how small or how large a part of the resistance 96 is introduced into the circuit. When the lever 90 is in its extreme position 90a, the resistance 96 is ineffective, the current is maximum and the oil pressure is sufficient to release the brake shoe 121 against the pressure of the spring 123. When the lever is in the extreme position 90b, the resistance 96 is entirely in the circuit and the current is practically nil, thus eliminating the action of the pump, releasing the value 113 and reducing the oil pressure to zero.

In operation, starting with the lever 90 in its released position 90a, the current is maximum, the torque on the pump is maximum, the release valve 113 is closed, maximum oil pressure acts on the piston 118, spring 123 is entirely compressed and the shoe 121 is released. If a partial braking action is required, a partial movement of the lever 90 from position 90a to the full line position shown, introduces a part of the resistance 96 into the circuit and reduces the current. This causes the solenoid to partially release the valve 113 because of the high oil pressure present in the circuit and to allow release of some of the oil from the oil pressure circuit. The oil pressure is thus reduced under the action of the valve and the pumping unit, and adjusts itself to a new condition where the pull of the solenoid under the newly regulated current is just sufficient to hold the valve closed against the oil pressure developed by the stalled motor 99. The oil pressure, at this stage, is no longer sufficient to completely overcome the action of the spring 123, but, however, balances a part of the spring pressure so that a partial braking action is obtained.

To obtain a maximum braking action the lever 90 is placed in the position 90b, in which position the resistance 96 is entirely in the circuit and practically nullifies the current, thereby stopping the action of the motor and solenoid, releasing the valve 113 and reducing the oil pressure to zero so that the full pressure of the spring 123 becomes active for braking.

It becomes apparent that the function of the lever 90 and resistance 96 regulates the braking action in a manner similar to the control 29 used in conjunction with the unit 10. That is, both controls function to regulate the braking action according to the extent of their movement. It will be obvious that the lever 90 may be used in conjunction with a plurality of resistances 90, and therefore may be used to control in any selected sequence any desired number of braking units, such for example as those described in conjunction with the unit 10.

Although specific embodiments of the invention have been illustrated and described, it will be understood that various changes may be made within the scope of the appended claims without departing from the spirit of the invention, and such changes are contemplated.

What is claimed is:

1. In a braking system, a multiplicity of fluid pressure operated brakes arranged in sets containing one or more individual brakes, power units individual to said sets, each power unit having means for pumping and supplying fluid under pressure to said sets, valve means for regulating the pressure of the fluid at the brakes of said sets, said valve means being adapted to be acted upon by a force urging movement thereof to one of its positions, a solenoid adapted to exert a force opposing the first force, and manually controlled means for supplying current to said solenoid and for regulating the current at the will of the operator to cause said solenoid to exert varying forces ranging from zero to a force greater than the first named force, said manually controlled means automatically operating the valve of one unit in advance of another valve of another unit.

2. In a vehicle braking system, a vehicle having a multiplicity of sets of brakes, each axle of said vehicle being equipped with one of said sets, a power unit individual to each of said sets, each power unit having means for pumping and supplying liquid under pressure to one of said sets and valve means for regulating the pressure directed to said brakes, said valve means being adapted to be acted upon by a force urging movement of said valve to one of its positions, a solenoid adapted to exert a force opposing the first force, and manually controlled means for supplying current to said solenoid and for regulating the current at the will of the operator to cause said solenoid to exert varying forces ranging from zero to a force greater than the first named force, said manually controll means automatically operating the valve of one unit in advance of another valve of another unit.

3. In a braking system, a vehicle having a pair of trucks each having a pair of axles, motors on the trucks having shafts geared to respective axles, fluid pressure operated brakes associated with respective motor shafts, a power unit individual to the brakes of each of said axles, each power unit comprising fluid pumping means for supplying liquid under pressure to the brakes, a valve for regulating the pressure of the fluid at the brakes, said valve means being adapted to be acted upon by a force urging movement thereof to one of its positions, a solenoid adapted to exert a force opposing the first force, and manually controlled means for supplying current to said solenoid and for regulating the current at the will of the operator to cause said solenoid to exert varying forces ranging from zero to a force greater than the first named force, said manually controlled means automatically operating the valve of one unit in advance of another valve of another unit.

4. In combination with a hydraulic brake, a liquid circuit for said brake, said liquid circuit comprising a pump for supplying liquid under pressure to said cylinder and a valve for discharging liquid to reduce such pressure, and an electric circuit comprising a torque motor connected to said pump for operating the same, a solenoid in series with said motor and connected to said valve for closing the valve against the liquid pressure when said solenoid is energized, a source of electricity for said electric circuit, and a manually controlled resistance in said electric circuit for regulating the current supplied to said motor and said solenoid, the torque of said motor being so correlated with the power of said solenoid that the solenoid exerts a force just sufficient to maintain said valve closed against the oil pressure developed in the liquid circuit by the motor when stalled regardless of the regulation of the current supply.

5. In combination, a brake mechanism comprising a brake having a preloaded spring for applying the same, a cylinder, a movable element in said cylinder and connected to said brake and adapted in the presence of hydraulic pressure in said cylinder to exert a force in opposition to that of said spring, a liquid circuit comprising a pump for supplying liquid under pressure to said cylinder and a valve for discharging liquid to reduce such pressure, and an electric circuit comprising a torque motor connected to said pump for operating the same, a solenoid in series with said motor and connected to said valve for closing the valve against the liquid pressure when said solenoid is energized, a source of electricity for said electric circuit, and a manually controlled resistance in said electric circuit for regulating the current supplied to said motor and said solenoid that the solenoid exerts a force just sufficient to maintain said valve closed against the oil pressure developed in the liquid circuit by the motor when stalled regardless of the regulation of the current supply.

6. In a braking system, a plurality of sets of brakes, power units individual to each of said sets, each power unit comprising a fluid circuit including a pump for supplying fluid under pressure to each of a cylinder and a valve for discharging fluid to each of said sets, and an electric circuit including a torque motor connected to said motor for operation thereof, a solenoid in circuit with said motor and connected to said valve, a source of electricity for said electric circuit, and a manually controlled resistance in said electric circuit for regulating the current supplied to said motor and said solenoid, the torque of said motor being so correlated with the power of said solenoid that the solenoid exerts a force just sufficient to maintain said valve closed against the oil pressure developed in the liquid circuit by the motor when stalled regardless of the regulation of the current supply.

7. In a railway braking system, a vehicle having a pair of trucks each having a pair of axles, a set of brakes individual to each of said axles, a power unit individual to each of said sets, each power unit comprising a fluid circuit including a pump for supplying fluid under pressure to each of a cylinder and a valve for discharging fluid to each of said sets, and an electric circuit including a torque motor connected to said motor for operation thereof, a solenoid in circuit with said motor and connected to said valve, a source of electricity for said electric circuit, and a manually controlled resistance in said electric circuit for regulating the current supplied to said motor and said solenoid, the torque of said motor being so correlated with the power of said solenoid that the solenoid exerts a force just sufficient to maintain said valve closed against the oil pressure developed in the liquid circuit by the motor when stalled regardless of the regulation of the current supply.

8. In a railway braking system, a vehicle having a pair of trucks each having a pair of axles, a set of brakes individual to each of said trucks, a power unit individual to each of said sets, each power unit comprising a fluid circuit including a pump for supplying fluid under pressure to each of a cylinder and a valve for discharging fluid to each of said sets, and an electric circuit including a torque motor connected to said motor for operation thereof, a solenoid in circuit with said motor and connected to said valve, a source of electricity for said electric circuit, and a manually controlled resistance in said electric circuit for regulating the current supplied to said motor and said solenoid, the torque of said motor being so correlated with the power of said solenoid that the solenoid exerts a force just sufficient to maintain said valve closed against the oil pressure developed in the liquid circuit by the motor when stalled regardless of the regulation of the current supply.

9. In a braking system, a vehicle having a plurality of axles, a brake shoe adjacent each end of each of said axles, said brakes shoes on each side of said truck being connected in sets, a power unit individual to each of said sets, each power unit comprising a fluid circuit including a pump for supplying fluid under pressure to each of a cylinder and a valve for discharging fluid to each of said sets, and an electric circuit including a torque motor connected to said motor for operation thereof, a solenoid in circuit with said motor and connected to said valve, a source of electricity for said electric circuit, and a manually controlled resistance in said electric circuit for regulating the current supplied to said motor and said solenoid, the torque of said motor being so correlated with the power of said solenoid that the solenoid exerts a force just sufficient to maintain said valve closed against the oil pressure developed in the liquid circuit by the motor when stalled regardless of the regulation of the current supply.

10. In a braking system, a multiplicity of coupled vehicles, each vehicle having hydraulic brakes thereon, a power unit individual to each vehicle for operating all brakes thereof, each power unit comprising a fluid circuit including a pump for supplying fluid under pressure to each of a cylinder and a valve for discharging fluid to each of said sets, and an electric circuit including a torque motor connected to said motor for operation thereof, a solenoid in circuit with said motor and connected to said valve, a source of electricity for said electric circuit, and a manually controlled resistance in said electric circuit for regulating the current supplied to said motor and said solenoid, the torque of said motor being so correlated with the power of said solenoid that the solenoid exerts a force just sufficient to maintain said valve closed against the oil pressure developed in the liquid circuit by the motor when stalled regardless of the regulation of the current supply.

EMIL H. PIRON.